US012626339B2

(12) United States Patent (10) Patent No.: US 12,626,339 B2
Yamamoto et al. (45) Date of Patent: May 12, 2026

(54) IMAGE PROCESSING METHOD AND IMAGE PROCESSING DEVICE

(71) Applicant: JOB CORPORATION, Yokohama (JP)

(72) Inventors: Shuichiro Yamamoto, Yokohama (JP); Natsumi Kimoto, Yokohama (JP); Hiroaki Hayashi, Kanazawa (JP); Daiki Kobayashi, Kanazawa (JP)

(73) Assignee: Job Corporation, Kanagawa (JP)

( * ) Notice: Subject to any disclaimer, the term of this patent is extended or adjusted under 35 U.S.C. 154(b) by 266 days.

(21) Appl. No.: 18/536,424

(22) Filed: Dec. 12, 2023

(65) Prior Publication Data

US 2025/0148579 A1 May 8, 2025

(30) Foreign Application Priority Data

Nov. 2, 2023 (JP) ................................. 2023-188474

(51) Int. Cl.
*G06T 5/73* (2024.01)
*G06T 5/50* (2006.01)
*G06T 7/11* (2017.01)

(52) U.S. Cl.
CPC .................. *G06T 5/73* (2024.01); *G06T 5/50* (2013.01); *G06T 7/11* (2017.01); *G06T 2207/10116* (2013.01)

(58) Field of Classification Search
CPC ..... G06T 5/73; G06T 5/50; G06T 7/11; G06T 2207/10116
See application file for complete search history.

(56) References Cited

U.S. PATENT DOCUMENTS 6,819,717 B1 * 11/2004 Sasai ...................... H04N 19/86
375/E7.193
7,773,677 B2 * 8/2010 Lee ...................... H04N 19/895
375/240.27

(Continued)

FOREIGN PATENT DOCUMENTS

JP 2009-000164 A 1/2009
WO 2019/083014 A1 5/2019

OTHER PUBLICATIONS

Daiki Kobayashi, "Development of image blur correction method for quantitative image analysis of photon counting detector" It was presented at a presentation meeting of a graduation research project of National University Corporation Kanazawa University on Dec. 16, 2022. An abstract of the presentation meeting and an English machine translation thereof are attached.

(Continued)

*Primary Examiner* — Xuemei G Chen
(74) *Attorney, Agent, or Firm* — Carrier, Shende & Associates P.C.; Joseph P. Carrier; Fulchand P. Shende

(57) ABSTRACT

A plurality of pixel values $n_H$, $n_M$, and $n_L$ acquired from a target region include one reference pixel value and the other pixel value, and an image processing method includes: a correction pattern determination step of setting in advance a plurality of correction patterns and determining the correction pattern to be applied to the target region on the basis of the reference pixel value; a correction step of correcting the reference pixel value and the other pixel value by determined correction patterns A, B, and C; and a generation step of generating an image of an imaging target on the basis of the corrected pixel values of a plurality of target regions.

10 Claims, 5 Drawing Sheets

(56) References Cited

U.S. PATENT DOCUMENTS

| | | | | |
|---|---|---|---|---|
| 2002/0080253 A1* | 6/2002 | Kim | .................... | H04N 25/633 |
| | | | | 348/E5.081 |
| 2005/0135704 A1* | 6/2005 | Kim | .................... | H04N 1/4097 |
| | | | | 382/275 |
| 2006/0221214 A1* | 10/2006 | Yanof | .................... | H04N 1/401 |
| | | | | 348/E5.081 |
| 2007/0098260 A1* | 5/2007 | Yen | .................... | G06V 40/193 |
| | | | | 382/167 |
| 2011/0135011 A1* | 6/2011 | Eddy | ........................ | G06T 5/70 |
| | | | | 375/240.29 |
| 2012/0128244 A1* | 5/2012 | Singh | ........................ | G06T 5/70 |
| | | | | 382/167 |
| 2012/0237124 A1* | 9/2012 | Bosco | ........................ | G06T 5/20 |
| | | | | 382/167 |
| 2017/0294001 A1* | 10/2017 | Zhang | ........................ | G06T 5/10 |
| 2018/0139449 A1* | 5/2018 | Choi | .................... | H04N 19/14 |
| 2018/0182074 A1* | 6/2018 | Li | ............................. | G06T 5/73 |
| 2020/0120272 A1* | 4/2020 | Furukawa | .............. | H04N 25/60 |
| 2020/0138398 A1* | 5/2020 | Yamakawa | .............. | A61B 6/00 |
| 2020/0249179 A1* | 8/2020 | Yamakawa | .............. | G01T 1/36 |
| 2020/0279352 A1* | 9/2020 | Mao | ........................ | G06T 5/20 |
| 2021/0174489 A1* | 6/2021 | Liu | ........................ | G06T 7/11 |
| 2024/0054613 A1* | 2/2024 | Luo | ........................ | G06T 5/50 |

OTHER PUBLICATIONS

It was presented as an abstract booklet for the Technology Meeting of the 79th General Meeting of Japanese Society of Radiological Technology on Mar. 10, 2023. An abstract booklet is attached.
It was presented as an abstract booklet for 2023 IEEE NSS MIC RTSD on Oct. 17, 2023. An abstract booklet is attached.

* cited by examiner

IMAGE PROCESSING METHOD AND IMAGE PROCESSING DEVICE

BACKGROUND OF THE INVENTION

1. Technical Field

The present invention relates to an image processing method and an image processing device for processing an image acquired by an X-ray device or the like, and more specifically, to an image processing method and an image processing device capable of generating a highly accurate image.

2. Description of the Related Art

Various image processing methods such as an X-ray device have been proposed (for example, refer to JP 2009-164 A). JP 2009-164 A discloses an image processing method for generating an image in which an edge is emphasized by processing one image with three filters, and then, synthesizing the processed image. Such an image processing method has enabled the generation of an image in which boundary portions of different materials are clear. Since the image becomes clear, visibility has been improved.

The applicant has proposed an energy discrimination type X-ray device that acquires a pixel value for each energy range of X-rays (for example, refer to WO 2019/083014 A). The X-ray device described in WO 2019/083014 A acquires an image for each energy range from an imaging target, and synthesizes a plurality of images to generate one image.

In the X-ray device described in WO 2019/083014 A, there is a problem that quantitativity is lost when image processing of emphasizing an edge is performed by the method described in JP 2009-164 A. When the image processing of emphasizing the edge is performed, a deviation occurs in the estimated effective atomic number. There is a problem that the accuracy of the X-ray device as an energy analyzer is reduced.

SUMMARY OF THE INVENTION

The invention has been made in view of the above problems, and an object of the invention is to provide an image processing method and an image processing device capable of generating an image with high accuracy.

An image processing method for attaining the object described above is an image processing method for acquiring a plurality of pixel values from a target region constituting a part of an imaging target, determining a synthesis of the plurality of pixel values as a pixel value of the target region, and generating an image of the imaging target on the basis of a plurality of the target regions for which the pixel values are determined, the plurality of pixel values acquired from the target region include one reference pixel value and the other pixel value, and the image processing method includes: a correction pattern determination step of setting in advance a plurality of correction patterns and determining the correction pattern to be applied to the target region on the basis of the reference pixel value; a correction step of correcting the reference pixel value and the other pixel value by the determined correction pattern; and a generation step of generating the image of the imaging target on the basis of the corrected pixel values of the plurality of target regions.

An image processing device for attaining the object described above is an image processing device acquiring a plurality of pixel values from a target region constituting a part of an imaging target, determining a synthesis of the plurality of pixel values as a pixel value of the target region, and generating an image of the imaging target on the basis of a plurality of the target regions for which the pixel values are determined, the image processing device includes: an acquisition mechanism acquiring one reference pixel value and the other pixel value for each target region; a processing mechanism processing the pixel value acquired by the acquisition mechanism; and a storage mechanism storing a plurality of correction patterns used by the processing mechanism, in which the processing mechanism includes: a correction pattern determination unit determining the correction pattern to be applied to the target region on the basis of the reference pixel value; a correction unit correcting the reference pixel value and the other pixel value by the determined correction pattern; and a generation unit generating the image of the imaging target on the basis of the corrected pixel values of the plurality of target regions.

According to the invention, a plurality of pixel values obtained from one target region are corrected with the same correction pattern. It is possible to avoid a state where the plurality of pixel values obtained from one target region are corrected with different correction patterns and consistency is not obtained among the plurality of pixel values. The invention is advantageous for generating a highly accurate image.

DETAILED DESCRIPTION

Figure 1:
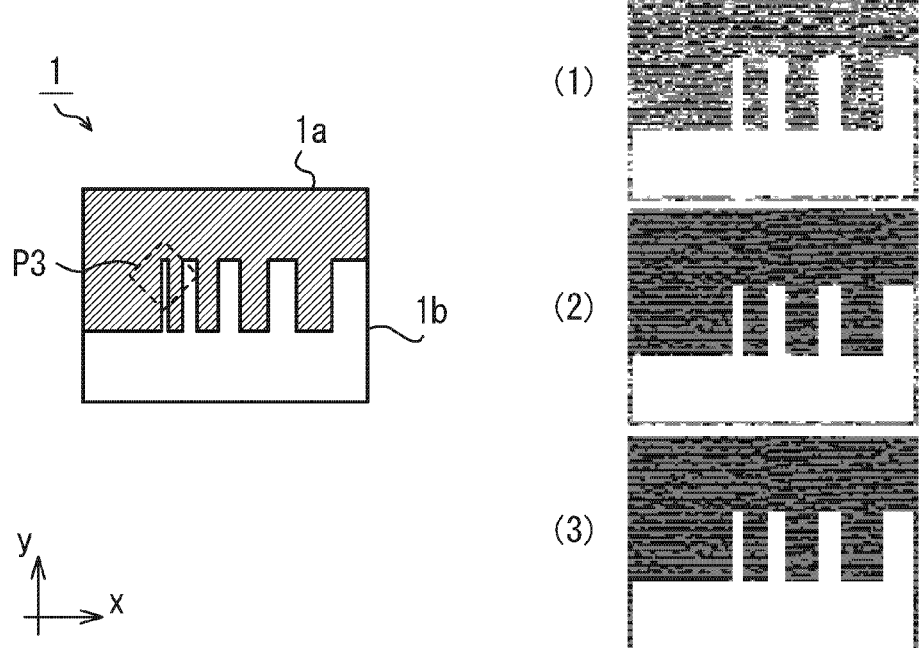
FIG. 1 is an explanatory diagram illustrating an imaging target and a plurality of acquired images.

Hereinafter, an image processing method and an image processing device will be described on the basis of an embodiment illustrated in the drawings. In the drawings, a horizontal direction is indicated by an arrow x, a vertical direction crossing the horizontal direction x at a right angle is indicated by an arrow y, and a height direction orthogonal to the horizontal direction x and the vertical direction y is indicated by an arrow z.

The image processing method of the invention will be described by using a case where an imaging target 1 is imaged by an energy discrimination type X-ray device as an example. As illustrated on the left side in FIG. 1, the imaging target 1, for example, contains an experimental substance in which aluminum 1a and acrylic 1b are combined. In FIG. 1, the region of aluminum $1a$ is hatched for the sake of description. The imaging target 1, for example, is configured to have a size of 40 mm in the horizontal direction x, 30 mm in the vertical direction y, and 10 mm in the height direction z. The atomic number of the aluminum $1a$ is 13 and the effective atomic number of the acrylic $1b$ is 6.5.

When the X-ray device irradiates the imaging target 1 with an X-ray along the height direction z, the X-ray transmitted through the imaging target 1 is detected by a detector. The detector, for example, includes a detection layer including a semiconductor (CdTe, CZT (CdZnTe), or the like) that directly converts an X-ray into an electric signal. This detection layer is configured, for example, by arranging 200 μm×200 μm pixels in the horizontal direction x and the vertical direction y. At the time of imaging, a pixel value is obtained for each pixel.

The energy discrimination type X-ray device counts the number of photons in a state discriminated for each predetermined energy range, in accordance with the magnitude of the energy of the photons detected by the pixels of the detector. For example, three energy ranges of high energy BIN, medium energy BIN, and low energy BIN are set. For example, when 100 photons are incident on one pixel, 20 photons are counted for the high energy BIN, 50 photons are counted for the medium energy BIN, and 30 photons are counted for the low energy BIN for each energy range. As illustrated on the right side in FIG. 1, an image is generated for each energy range. FIG. 1 illustrates an image corresponding to the high energy BIN as (1), an image corresponding to the medium energy BIN as (2), and an image corresponding to the low energy BIN as (3). The energy range set in advance is not limited to three energy ranges, and may be set to two or four or more energy ranges.

Figure 2:
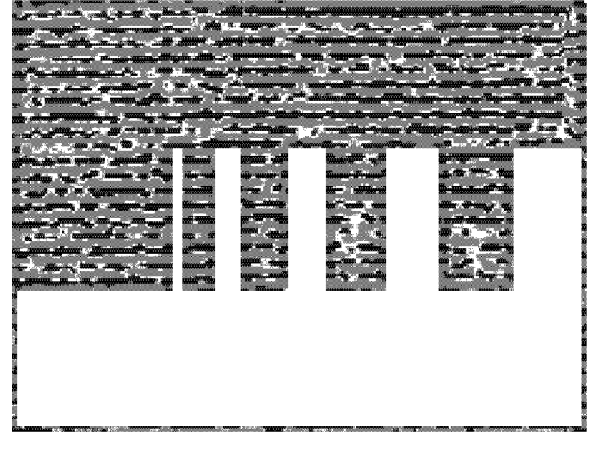
FIG. 2 is an explanatory diagram illustrating an image generated by synthesizing a plurality of images in FIG. 1.
Figure 2:
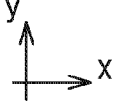

As illustrated in FIG. 2, one X-ray image is generated by synthesizing three images generated for each energy range. The X-ray image is an effective atomic number image reflecting the atomic number of the substance constituting imaging target 1. In the effective atomic number image, the effective atomic number is expressed by a color scale or a black and white scale. Here, the synthesizing includes performing an arithmetic using pixel values of a plurality of images and newly generating a pixel value.

Figure 3:
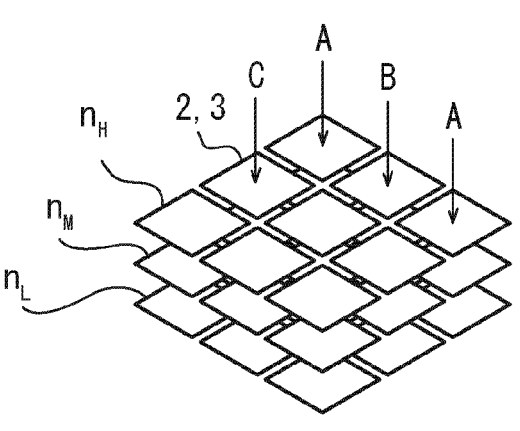
FIG. 3 is an explanatory diagram schematically illustrating a state of an acquired pixel value.

The above explanation is a step of obtaining the X-ray image by the energy discrimination type X-ray device of the related art. Next, an image processing method of the invention will be described. FIG. 3 schematically illustrates the state of a pixel value n acquired in 3×3 pixels 2. In the imaging of the imaging target 1, the pixel value n is acquired for each target region 3. In this embodiment, one pixel 2 is set as one target region 3. A plurality of pixels 2 may be set as one target region 3.

In one target region 3, the pixel value n is acquired for each energy range. For example, in the target region 3 of 3×3, the pixel values n of 3×3×3=27 are acquired. In FIG. 3, for the sake of description, three pixel values n acquired in one target region 3 are represented by laminating the target region 3 in the height direction in FIG. 3. Hereinafter, in this specification, the height direction in FIG. 3 may be referred to as a virtual height direction z'. The virtual height direction is a concept different from the actual height z. The pixel values represented by laminating the target region 3 in the virtual height direction are virtual, and merely represent that three pixel values n are obtained from one target region 3. The actual target regions 3 are formed in parallel in the horizontal directions x and y, and are not formed in plural in the height direction z. In a certain target region 3, a pixel value $n_H$ corresponding to the high energy BIN, a pixel value $n_M$ corresponding to the medium energy BIN, and $n_L$ corresponding to the low energy BIN are acquired. These three pixel values can be referred to as a pixel value when imaging the same place (the same coordinates) in the imaging target 1.

The three pixel values $n_H$, $n_M$, and $n_L$ include one reference pixel value and the other pixel value. For example, in a case where the pixel value $n_H$ corresponding to the high energy BIN is set to the reference pixel value, the pixel value $n_M$ corresponding to the medium energy BIN and the pixel value $n_L$ corresponding to the low energy BIN are the other pixel value. The reference pixel value can be set in advance. Specifically, for example, it is possible to set in advance the pixel value $n_H$ corresponding to the high energy BIN as the reference pixel value.

Figure 4:
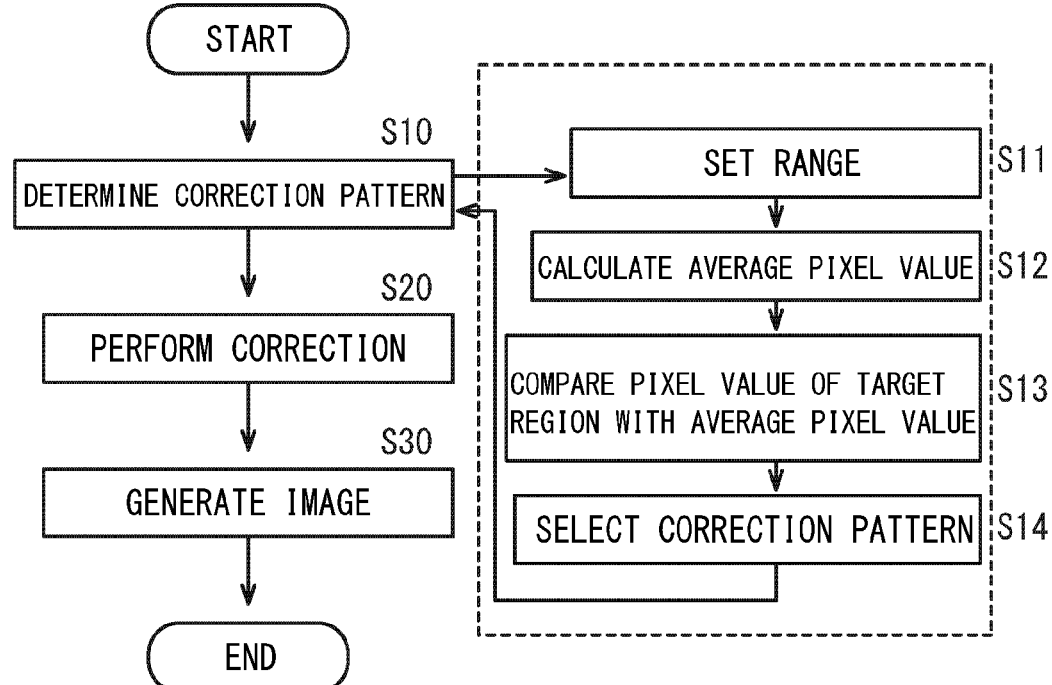
FIG. 4 is an explanatory diagram illustrating a flow of an image processing method.

In a case where the image processing method is started as illustrated in FIG. 4, one correction pattern to be applied to one target region 3 is determined from a plurality of correction patterns set in advance (hereinafter, may be referred to as a correction pattern determination step S10). Specifically, for example, three correction patterns of a pattern A, a pattern B, and a pattern C are set in advance. In the correction pattern determination step S10, for example, one correction pattern such as the pattern A is determined on the basis of the reference pixel value. As illustrated in FIG. 3, the correction pattern is determined for each target region 3.

The reference pixel value and the other pixel value are corrected by the determined correction pattern (hereinafter, may be referred to as a correction step S20). In a case where the pattern A is determined in the certain target region 3, the reference pixel value and other pixel value in this target region 3 are corrected by the pattern A. That is, a plurality of pixel values $n_H$, $n_M$, and $n_L$ obtained from the same coordinates of the imaging target 1 are corrected by a common pattern in the correction step S20. All three target regions 3 laminated in the virtual height direction z' are corrected by the same correction pattern. In the plurality of target regions 3, each of the pixel values n is corrected. In the example of FIG. 3, 27 pixel values n are corrected.

The image of the imaging target 1 is generated on the basis of pixel values n' corrected in the plurality of target regions 3 (hereinafter, may be referred to as a generation step S30). The pixel value n is corrected for each target region 3, and one image is generated on the basis of the corrected pixel value n'. Specifically, for example, the pixel values $n_H$, $n_M$, and $n_L$ are corrected to obtain three corrected pixel values n'. In the embodiment illustrated in FIG. 3, 27 corrected pixel values n' are obtained. One image is generated by synthesizing 27 corrected pixel values n'.

In one target region 3 of FIG. 3, the three pixel values $n_H$, $n_M$, and $n_L$ superimposedly displayed in the virtual height direction z' are corrected with the same correction pattern. It is possible to avoid a state where the plurality of pixel values n acquired from one target region 3 are corrected by different correction patterns and consistency is not obtained among the plurality of pixel values n. It can be said that the consistency of the corrected pixel values n is obtained in the virtual height direction z'. Such an image processing method is advantageous for generating a highly accurate image.

Imaging to which the image processing method is applied is not limited to imaging using an energy discrimination type X-ray device. Such an image processing method is also applicable to magnetic resonance imaging (MRI) and computed tomography (CT). The image processing method described above can be applied insofar as the image processing method is an imaging method in which the plurality of pixel values n (the reference pixel values and the other pixel value) are acquired from one target region 3 specified by three-dimensional coordinates, for example, in the imaging target 1.

It is desirable that the reference pixel value includes the pixel values n acquired in the same condition for the plurality of target regions 3. In all the target regions 3, for example, it is possible to set in advance the pixel value $n_H$ of the high energy BIN as the reference pixel value. Since the pixel value n acquired in the same condition is set as the reference pixel value, it is possible to avoid a problem that the consistency of the correction patterns is not obtained in the target regions 3. It can be said that the consistency of the corrected pixel value n' is obtained in the horizontal directions x and y of FIG. 3. The image processing method having the configuration described above is advantageous for generating a more highly accurate image.

Here, the same condition indicates the same method or the same time. The same method refers to a method of acquiring the pixel values in the same energy range or in the same measurement condition. The same time refers to a method of acquiring the pixel values n at the same time in a case where imaging is performed a plurality of times.

The reference pixel value may include the pixel values n acquired in different conditions depending on the target region 3. Specifically, the reference pixel value of the certain target region 3 may include the pixel value $n_H$ of the high energy BIN, and the reference pixel value of the other target region 3 adjacent thereto may include the pixel value $n_L$ of the low energy BIN. In this case, one of the plurality of acquired pixel values n is determined as the reference pixel value. For example, the pixel value n having the largest value can be determined as the reference pixel value. In this case, a condition for determining the reference pixel value is set in advance.

Next, an image processing device 4 for attaining the image processing method described above will be described. The image processing device 4 can be configured by various known computers. This computer includes a central processing unit (CPU), a main storage unit (a memory), and an auxiliary storage unit (for example, HDD). The computer may have a configuration in which an input unit (a keyboard and a mouse) and an output unit (a display and a printer) are connected.

Figure 5:
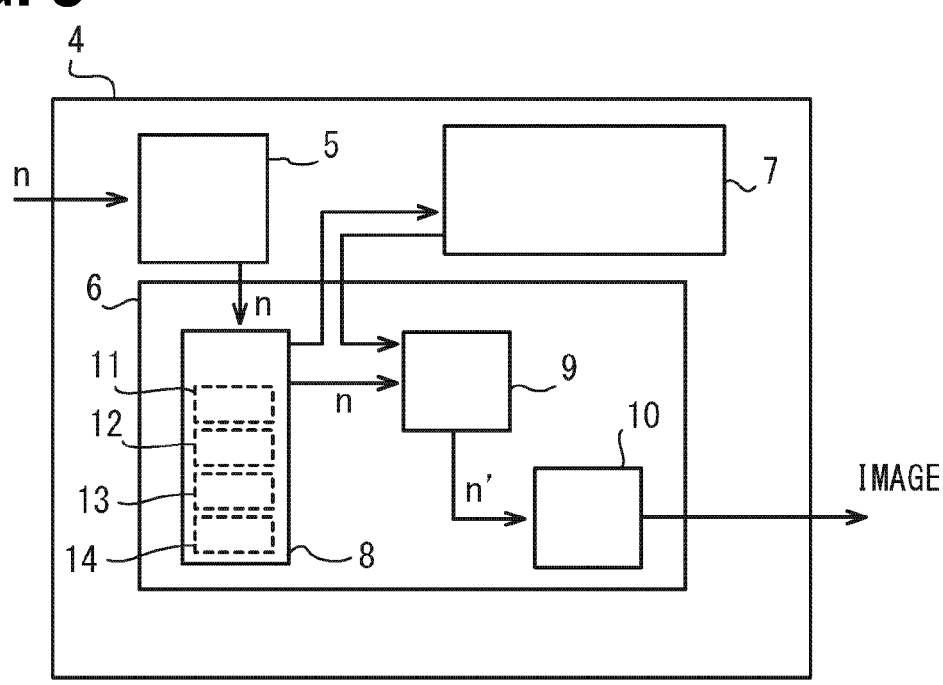
FIG. 5 is an explanatory diagram schematically illustrating an image processing method.

As illustrated in FIG. 5, the image processing device 4 includes an acquisition mechanism 5 that distinctively acquires the pixel values n acquired by the detector or the like for each target region 3, a processing mechanism 6 that processes the pixel values n acquired by the acquisition mechanism 5, and a storage mechanism 7 that stores the plurality of correction patterns used by the processing mechanism 6. The processing mechanism 6 includes a correction pattern determination unit 8 that executes the correction pattern determination step S10, a correction unit 9 that executes the correction step S20, and a generation unit 10 that executes the generation step S30.

The correction pattern determination unit 8 acquires the plurality of pixel values n from the acquisition mechanism 5, and determines the correction pattern on the basis of the reference pixel value among the pixel values n. The determined correction pattern such as the pattern A is read from the storage mechanism 7 to the processing mechanism 6. The correction unit 9 corrects the pixel value n on the basis of the pixel value n and the correction pattern read from the storage mechanism 7. The generation unit 10 generates the image of the imaging target 1 on the basis of the pixel value n' corrected by the correction unit 9. The generated image is displayed on, for example, a display connected to a computer.

Next, a specific example of the correction pattern determination step S10 will be described. As illustrated in FIG. 4, the correction pattern determination step S10 may include a range setting step S11 of setting a predetermined range P1 centering around the target region 3, an average calculation step S12 of calculating an average pixel value M in the range P1, a comparison step S13 of comparing the pixel value n of the target region 3 with the average pixel value M, and a selection step S14 of selecting the correction pattern in accordance with a comparison result. In FIG. 4, specific processing included in the correction pattern determination step S10 is indicated by being surrounded with a broken line for the sake of description.

Figure 6:
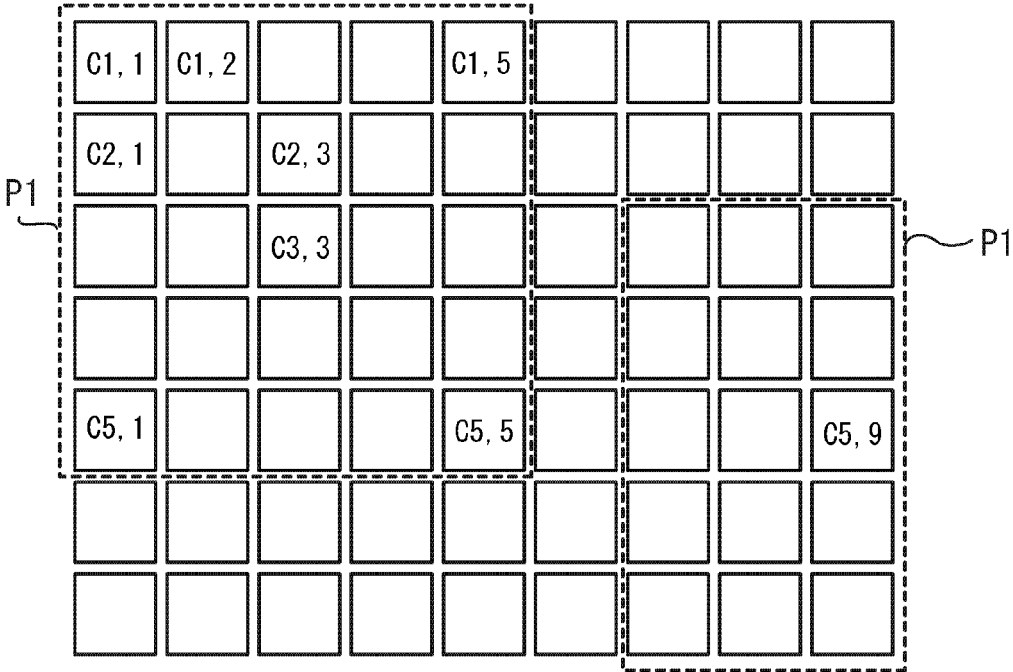
FIG. 6 is an explanatory diagram illustrating a correction range set for a pixel.

As illustrated in FIG. 6, in range setting step S11, a quadrangular range (hereinafter, may be referred to as a correction range P1) including 5×5 target regions 3 centering around one target region 3 (for example, C3, 3) to be corrected is set. 25 target regions 3 including the target region 3 (C3, 3) to be corrected are set as the correction range P1. In FIG. 6, the correction range P1 is indicated by a broken line for the sake of description.

The size of the correction range P1 is not limited to 5×5, and the number may be increased, for example, to 7×7. As the number of target regions 3 included in the correction range P1 increases, a correction accuracy can be improved. On the other hand, as the number increases, an arithmetic amount required for correcting the pixel value n increases. In a case where the number of target regions 3 excessively increases, the influence of the correction excessively increases, and thus, a deviation between the real imaging target 1 and the generated image may increase.

The size of the correction range P1 may be reduced by, for example, to 3×3. As the number of target regions 3 included in the correction range P1 decreases, the arithmetic amount required for correcting the pixel value n can be decreased. On the other hand, as the number decreases, the influence of noise relatively increases, and thus, there is a possibility that the correction accuracy decreases.

The image processing device 4 may have a configuration in which the correction range P1 can be changed by an operation. Suitable imaging can be attained by changing the correction range P1, in accordance with the size of the imaging target 1, in particular, the size of a range desired to be imaged.

The shape of the correction range P1 is not limited to a square. The shape of the correction range P1 may be a rectangle, a circle, a triangle, or the like. The correction range may be configured as a polygon of a pentagon or more. The correction range P1 may be formed in a cross shape or a rhombus centered around the target region 3.

In the average calculation step S12, first, the pixel values n of the target region 3 (C1, 1 to C5, 5) included in the correction range P1 are arranged in order of size. The pixel values n are n1, n2, . . . , n25 in ascending order of value. Here, in a case where the reference pixel value in the target region 3 (C3, 3) is a pixel value ni of the high energy BIN, all the pixel values n1 to 25 are the pixel value of the high energy BIN. In a case where the reference pixel value in the target region 3 (C3, 3) is the pixel value ni of low energy BIN, the pixel values n1 to 25 are the pixel value of low energy BIN.

Next, the average pixel value M in the correction range P1 is calculated. The average pixel value M can be represented by, for example, an average value of three pixel values (n1 to 3) from the smaller side and three pixel values (n23 to 25) from the larger side in the correction range P1. Specifically, the average pixel value M can be expressed by M=(n1+n2+ n3+n23+n24+n25)/6. The average pixel value M is not limited to the above explanation, and may be an average value of four or more pixel values n on each of the smaller side and the larger side. Furthermore, the average pixel value M may be represented by an average value of all the pixel values n in the correction range P1. Specifically, the average pixel value M can be expressed by M=(n1+ . . . +n25)/25.

In the comparison step S13, the average pixel value M is compared with the pixel value ni of the target region 3 (C3, 3) to be corrected. In the selection step S14, the correction pattern is determined in accordance with the comparison result.

The correction pattern is determined in accordance with which value the pixel value ni of the target region 3 (C3, 3) to be corrected has in comparison with the pixel value n of the surrounding target region 3. Therefore, the pixel value ni of the target region 3 (C3, 3) to be corrected can be corrected while effectively utilizing the pixel value n of the surrounding target region 3. This configuration is advantageous for generating a highly accurate image.

As with the above explanation, the correction range P1 of 5×5 centered on the target region 3 is also set for the target region 3 (C3, 4) to be corrected, and the pixel value ni of the target region 3 (C3, 4) is corrected. In a case where the reference pixel value in the target region 3 (C3, 4) is the medium energy BIN, the pixel value n used for calculating the average pixel value M is the pixel value n of the medium energy BIN. By repeating the above process, the pixel values ni of the plurality of target regions 3 are corrected.

As illustrated in FIG. 6, in the range setting step S11, in a case where the target region 3 (C5, 9) to be corrected corresponds to the edge portion of the image, the correction range P1 may deviate from the image and the correction range P1 of 5×5 may not be set. As described above, the correction step S20 may not be performed with respect to the target region 3 for which the correction range P1 is not capable of being set. When imaging is performed with the X-ray device or the like, in most cases, imaging is performed by arranging the imaging target 1 such that a particularly important portion is at the center of the image. The edge portion of the image obtained by imaging is less required for accuracy. Therefore, for the target region 3 for which the correction range P1 is not capable of being set, there is almost no problem in the accuracy as an image even in a case where the correction is not performed. The shape of the correction range P1 may be different between the center and the edge portion of the image.

The correction step S20 may be performed by using the pixel value n that is within the range set in the range setting step S11 and actually obtained. In this case, as illustrated in FIG. 6, the target region 3 (C5, 9) can be corrected by using the pixel value n in the correction range P1 surrounded by a broken line. In this case, the pixel value n included in the correction range P1 is n1 to 15. The average pixel value M can be expressed by, for example, M=(n1+n2+n3+n13+n14+ n15)/6.

As illustrated in FIG. 4, the correction pattern determination unit 8 that executes the correction pattern determination step S10 of the embodiment described above includes a range setting unit 11 that sets a predetermined range centering around the target region 3, an average calculation unit 12 that calculates the average pixel value M within the range, a comparison unit 13 that compares the pixel value ni of the target region 3 with the average pixel value M, and a selection unit 14 that selects the correction pattern according to the comparison result. In FIG. 4, for the sake of description, the range setting unit 11 and the like constituting the correction pattern determination unit 8 are indicated by a broken line.

Figure 7:
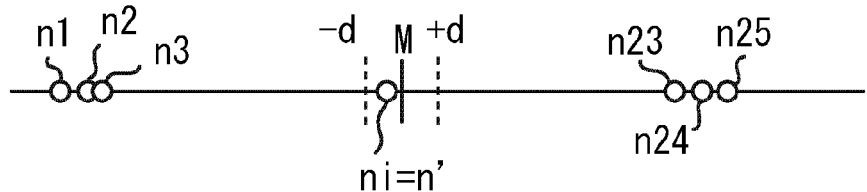
FIG. 7 is an explanatory diagram illustrating a correction pattern.
Figure 7:
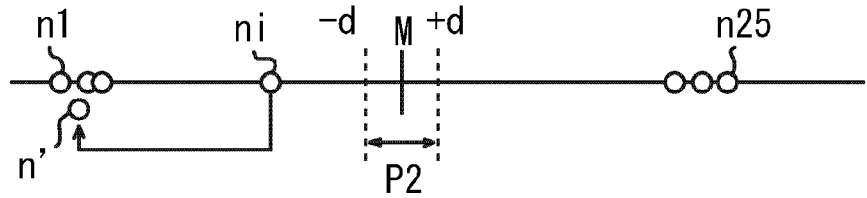
Figure 7:
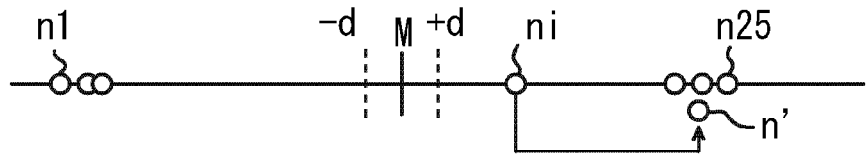

Next, a specific example of the correction pattern will be described. As illustrated in FIG. 7, a numerical range P2 is set in advance with reference to the average pixel value M. The numerical range P2 is set within a range of an allowable error ±d centering around the average pixel value M. The allowable error d is set to, for example, d=10. In a case where the number of photons that can be detected by one pixel 2 is, for example, 255, the pixel value n acquired from this pixel 2 is 0 to 255. 4% of the detectable pixel value n is 10. This number can be set in advance as the allowable error d. In a case where the maximum value of the values detectable by the pixel 2 is $d_{max}$, the allowable error d can be expressed by d=0.04 $d_{max}$.

It is desirable that the allowable error d is set within a range of 1 to 10% of the maximum value $d_{max}$. That is, the allowable error d is set within a range satisfying 0.01 $d_{max} \leq d \leq 0.10$ $d_{max}$. More desirably, the allowable error d is set within a range of 1 to 3% of the maximum value $d_{max}$. That is, the allowable error d is set within a range satisfying 0.01 $d_{max} \leq d \leq 0.03$ $d_{max}$. In a case where the target region 3 includes a plurality of pixels 2, the value detectable in one target region 3 is the maximum value $d_{max}$, and the allowable error d is set in advance on the basis of the maximum value $d_{max}$.

As illustrated in the upper part of FIG. 7, in a case where the pixel value ni of the target region 3 to be corrected is included in the numerical range P2, the pixel value ni of the target region 3 is adopted as the corrected pixel value n' (hereinafter, may be referred to as a pattern that is not corrected). Namely, in a case where M−d≤ni≤M+d is satisfied, the pixel value ni is not corrected.

As illustrated in the middle part of FIG. 7, in a case where the pixel value ni of the target region 3 to be corrected is smaller than the numerical range P2, an average value of a predetermined number of (for example, three) pixel values on the smaller side among the pixel values n1 to 25 within the range set in the range setting step S11 is adopted as the corrected pixel value n' (hereinafter, may be referred to as a decrease correction pattern). That is, in a case where ni<M−d is satisfied, n'=(n1+n2+n3)/3. As illustrated in the middle part of FIG. 7, the pixel value ni of the target region 3 is corrected to the corrected pixel value n'. The pixel value ni is corrected to a value smaller than the original value.

As illustrated in the lower part of FIG. 7, in a case where the pixel value ni of the target region 3 to be corrected is larger than the numerical range P2, an average value of a predetermined number of (for example, three) pixel values on the larger side among the pixel values n1 to 25 within the range set in the range setting step S11 is adopted as the corrected pixel value n' (hereinafter, may be referred to as an increase correction pattern). That is, in a case where M+d<ni is satisfied, n'=(n23+n24+n25)/3. As illustrated in the lower part of FIG. 7, the pixel value ni of the target region 3 is corrected to the corrected pixel value n'. The pixel value ni is corrected to a value larger than the original value.

The number of pixel values n (for example, n1 to 3) used to calculate the corrected pixel value n' is not limited to three. The number of pixel values n may be smaller than three, such as two or one. In addition, the number of pixel values may be larger than three, such as four or five. In a case where the number of pixel values n is excessively small, it is likely to be affected by noise, and there is a concern that the accuracy of the corrected pixel value n' decreases. In a case where the number of pixel values n is excessively large, the change amount of the corrected pixel value n' decreases, and it is difficult to correct blurring.

In a case where the pixel value ni of the target region 3 is close to the average pixel value M, the pattern that is not corrected is used, and thus, the state (the atomic number) of the imaging target 1 can be accurately reproduced in the image. In a case where the pixel value ni of the target region 3 is slightly smaller or slightly larger than the surroundings, the pixel value ni is corrected to a sufficiently small or sufficiently large value, and thus, the blurring of the image can be suppressed. This configuration is advantageous for generating a highly accurate image.

The correction pattern set in advance is not limited to the above explanation. The correction pattern can be suitably set in accordance with the type of imaging device such as the X-ray device or MRI, or the purpose of imaging. For example, in a case where the pixel value ni of the target region 3 is not included in the numerical range P2, the pixel value ni may be increased or decreased at a ratio set in advance. In a case where the pixel value ni of the target region 3 is smaller than the numerical range P2, the pixel value ni may be corrected, for example, to 20%, and in a case where the pixel value ni is larger than the numerical range P2, the pixel value ni may be corrected, for example, to 180%. Specifically, in a case where the average pixel value M=100, d=10, and the pixel value ni of the target region 3 is 80, the corrected pixel value n'=80×0.2=16. In a case where the pixel value ni of the target region 3 is 120, the corrected pixel value n'=120×1.8=216.

The specific contents of the correction pattern determination step S10 are not limited to the configuration illustrated in FIG. 4. In addition, the specific contents of the correction pattern determination unit 8 are not limited to the configuration illustrated in FIG. 5. For example, the correction pattern may be determined by comparing the pixel value ni of the target region 3 (C3, 3) with the pixel value of one adjacent target region 3 (C2, 3). When the pixel value ni of the target region 3 (C3, 3) is within a predetermined range of the pixel value n to be compared, the non-correction pattern may be used. When the pixel value ni is smaller than the predetermined range, the correction pattern may be used to decrease the pixel value ni. When the pixel value ni is larger than the predetermined range, the correction pattern may be used to increase the pixel value ni. In this case, the specific contents of the correction pattern determination step S10 are different from the configuration illustrated in FIG. 4. In addition, the specific contents of the correction pattern determination unit 8 are different from the configuration illustrated in FIG. 5.

The detector may include a line sensor in which the plurality of pixels 2 are arranged in a line. In this case, when the imaging target 1 passes through the line sensor while moving in one direction by a conveyor or the like, imaging is performed by the X-ray device. An image acquired by the line sensor is the same as that in a case where an image is imaged by the detector in which a large number of pixels 2 are arranged in the horizontal direction x and the vertical direction y. Therefore, even in the case of using the line sensor, the image processing method described above can be applied.

Figure 8:
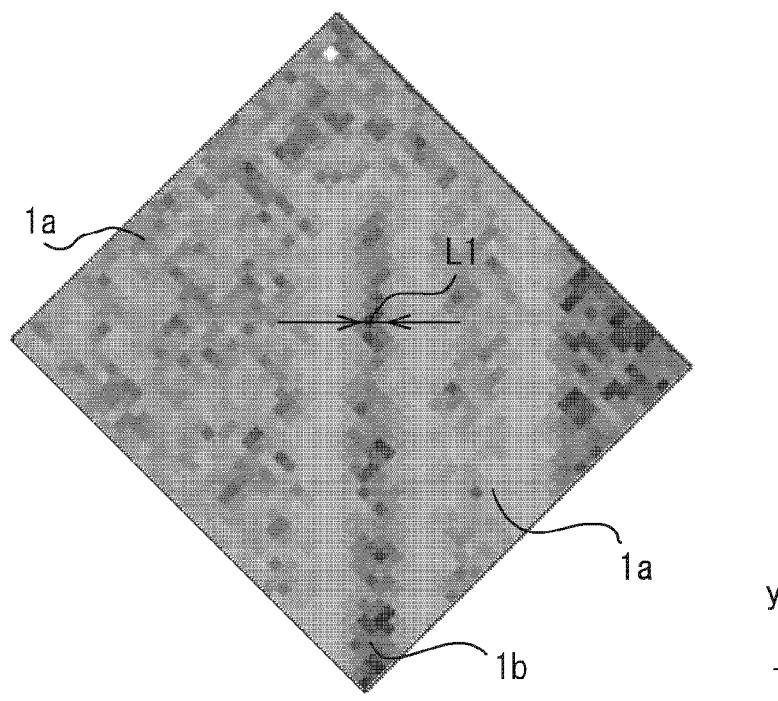
FIG. 8 is an explanatory diagram illustrating an image that is not corrected.

Next, the image obtained by the image processing method will be described. FIG. 8 illustrates an effective atomic number image when the imaging target 1 is imaged by the energy discrimination type X-ray device. In FIG. 8, the effective atomic number is expressed by a black and white scale. Such an image corresponds to an enlarged range P3 indicated by a broken line in FIG. 1. The image in FIG. 8 is an uncorrected image that is not corrected.

As illustrated in FIG. 8, blurring may occur in the image due to the influence of charge sharing or the like in a boundary portion between the aluminum 1a with atomic number of 13 and the acrylic 1b with effective atomic number of 6.5. A phenomenon (the charge sharing) in which a photon incident on a pixel 2 adjacent to a certain pixel 2 is detected as a photon detected in the certain pixel 2 may occur. Due to the influence of such charge sharing or the like, the blurring may occur in the image, and the accuracy of the image may decrease.

The image of FIG. 8 is an image in which it can be understood that a substance having another atomic number such as an effective atomic number of 9 exists between the aluminum 1a and the acrylic 1b. In addition, in the image of FIG. 8, it is not possible to accurately grasp a length L1 of the acrylic 1b in the horizontal direction x. The actual length L1 of the acrylic 1b in the imaging target 1 is 1 mm.

Figure 9:
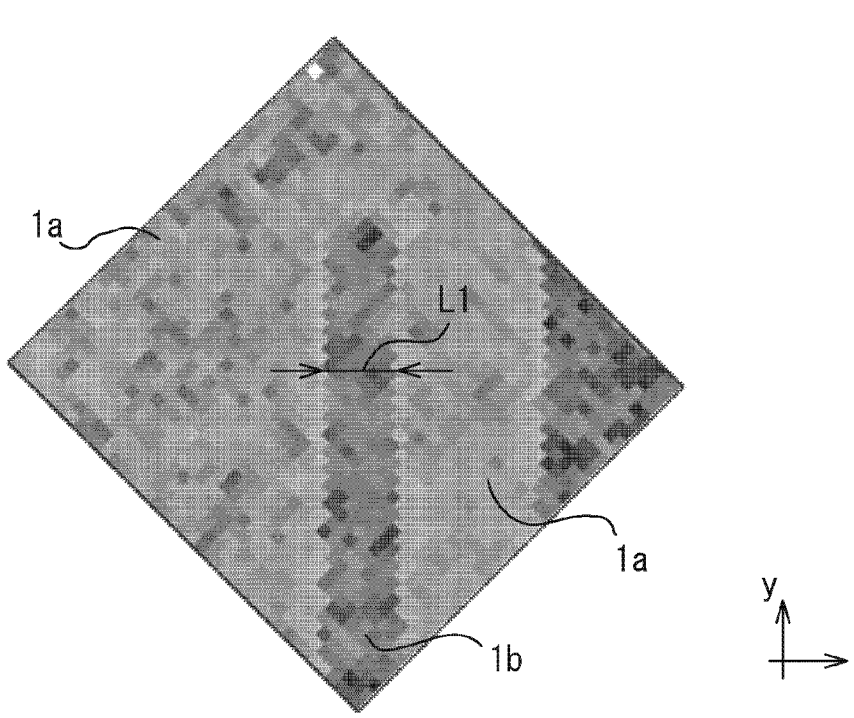
FIG. 9 is an explanatory diagram illustrating an image that is corrected by an image processing method.

FIG. 9 illustrates the effective atomic number image generated after the imaging target 1 is imaged by the energy discrimination type X-ray device and the pixel value n is corrected by the image processing method described above. According to the image processing method described above, the pixel value ni of the target region 3 is corrected to a state of being sufficiently small or sufficiently large with respect to the surrounding pixel value n in the boundary portion of substances having different atomic numbers. Namely, in a case where the change amount of the pixel value n in the correction range P1 is large and the pixel value n is smaller or larger than the numerical range P2, correction is performed to a state in where the change amount is sufficiently small or sufficiently large with respect to the average pixel value M. The blurring can be corrected to obtain an image in which the boundary portion of the substances is clear. Even in a case where blurring is corrected, the quantitativity is not lost, and thus, it is possible to obtain an image in which the effective atomic number is accurately indicated. In addition, in the image of FIG. 9, it is possible to accurately grasp the length L1 of the acrylic 1b in the horizontal direction x.

Figure 10:
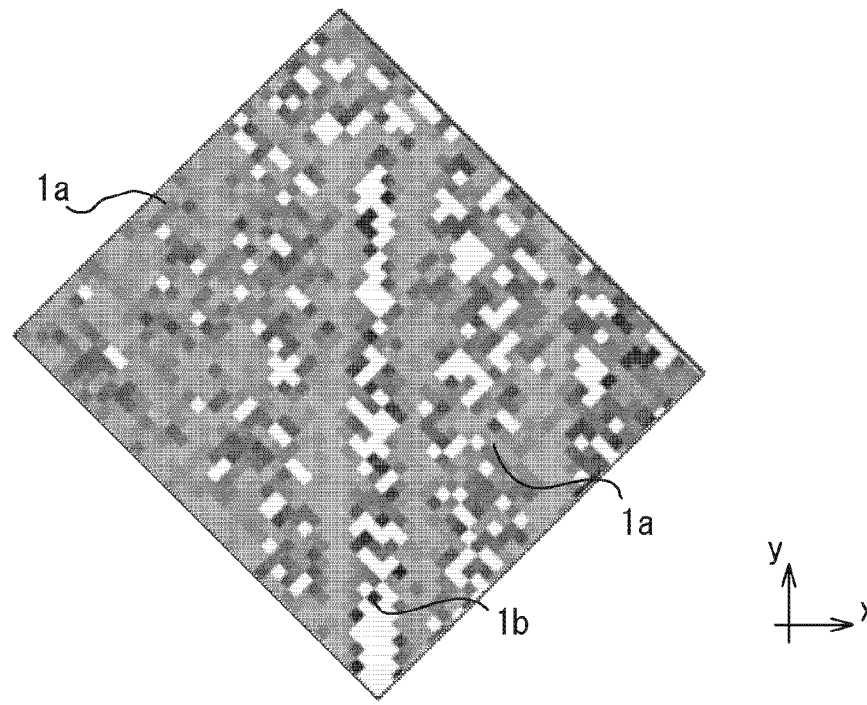
FIG. 10 is an explanatory diagram illustrating an image that is corrected by an image processing method of the related art.

FIG. 10 illustrates the effective atomic number image generated after the imaging target 1 is imaged by the energy discrimination type X-ray device and the image processing of emphasizing the edge is performed by the method described in JP 2009-164 A. Specifically, the image corresponding to the high energy BIN is subjected to the image processing of emphasizing the edge by the method described in JP 2009-164 A, and similarly, each of the images corresponding to the medium energy BIN and the low energy BIN are also subjected to the image processing by the method described in JP 2009-164 A. Thereafter, the corrected three images are synthesized to generate the effective atomic number image illustrated in FIG. 10.

Since the plurality of pixel values n acquired from one target region 3 may be corrected by different correction patterns, the consistency is not obtained among the plurality of pixel values n. This is a state in which the consistency of the corrected pixel values n is not obtained in the virtual height direction z'. Therefore, the quantitativity is greatly lost, and the estimated atomic number greatly deviates from the actual atomic number. In the image processing method of the related art, it is clear that the accuracy of the X-ray device as an energy analyzer is significantly reduced.

What is claimed is:

1. An image processing method for acquiring a plurality of pixel values from a target region constituting a part of an imaging target, including one reference pixel value and another pixel value, determining a synthesis of the plurality of pixel values as a pixel value of the target region, and generating an image of the imaging target on the basis of a plurality of the target regions for which the pixel values are determined, the method comprising:
    a correction pattern determination step performed by a correction pattern determination unit for setting in advance a plurality of correction patterns and determining the correction pattern to be applied to the target region on the basis of the reference pixel value;
    a correction step performed by a correction unit for correcting the reference pixel value and the other pixel value by the determined correction pattern; and
    a generation step performed by a generation unit for generating the image of the imaging target on the basis of the corrected pixel values of the plurality of target regions.

2. The image processing method according to claim 1, wherein the reference pixel value includes pixel values acquired in the same condition for the plurality of the target regions.

3. The image processing method according to claim 1, wherein the correction pattern determination step includes:
    a range setting step of setting a predetermined range centering around the target region; an average calculation step of calculating an average pixel value within the range;
    a comparison step of comparing the pixel value of the target region with the average pixel value; and
    a selection step of selecting the correction pattern in accordance with a comparison result.

4. The image processing method according to claim 2, wherein the correction pattern determination step includes:
    a range setting step of setting a predetermined range centering around the target region; an average calculation step of calculating an average pixel value within the range;
    a comparison step of comparing the pixel value of the target region with the average pixel value; and
    a selection step of selecting the correction pattern in accordance with a comparison result.

5. The image processing method according to claim 3, wherein the correction pattern includes:
    a non-correction pattern that adopts the pixel value of the target region in a case where the pixel value of the target region is included inside a predetermined numerical range set with reference to the average pixel value;
    a decrease correction pattern that adopts an average value of a predetermined number of pixel values on a smaller side among the pixel values within the range set in the range setting step in a case where the pixel value of the target region is smaller than the numerical range; and
    an increase correction pattern that adopts an average value of a predetermined number of pixel values on a larger side among the pixel values within the range set in the range setting step in a case where the pixel value of the target region is larger than the numerical range.

6. An image processing device acquiring a plurality of pixel values from a target region constituting a part of an imaging target, determining a synthesis of the plurality of pixel values as a pixel value of the target region, and generating an image of the imaging target on the basis of a plurality of the target regions for which the pixel values are determined, the device comprising: an acquisition mechanism acquiring one reference pixel value and the other pixel value for each target region; a processing mechanism processing the pixel value acquired by the acquisition mechanism; and a storage mechanism storing a plurality of correction patterns used by the processing mechanism, wherein the processing mechanism includes:
a correction pattern determination unit determining the correction pattern to be applied to the target region on the basis of the reference pixel value;
a correction unit correcting the reference pixel value and the other pixel value by the determined correction pattern; and
a generation unit generating the image of the imaging target on the basis of the corrected pixel values of the plurality of target regions.

7. The image processing device according to claim 6, wherein the reference pixel value includes pixel values acquired in the same condition for the plurality of the target regions.

8. The image processing device according to claim 6, wherein the correction pattern determination unit includes:
a range setting unit setting a predetermined range centering around the target region; an average calculation unit calculating an average pixel value within the range; a comparison unit comparing the pixel value of the target region with the average pixel value; and a selection unit selecting the correction pattern in accordance with a comparison result.

9. The image processing device according to claim 7, wherein the correction pattern determination unit includes:
a range setting unit setting a predetermined range centering around the target region; an average calculation unit calculating an average pixel value within the range; a comparison unit comparing the pixel value of the target region with the average pixel value; and a selection unit selecting the correction pattern in accordance with a comparison result.

10. The image processing device according to claim 8, wherein the correction pattern includes:
a non-correction pattern that adopts the pixel value of the target region in a case where the pixel value of the target region is included inside a predetermined numerical range set with reference to the average pixel value;
a decrease correction pattern that adopts an average value of a predetermined number of pixel values on a smaller side among the pixel values within the range set by the range setting unit in a case where the pixel value of the target region is smaller than the numerical range; and
an increase correction pattern that adopts an average value of a predetermined number of pixel values on a larger side among the pixel values within the range set in the range setting unit in a case where the pixel value of the target region is larger than the numerical range.

* * * * *